US011727756B2

(12) United States Patent
Burgin et al.

(10) Patent No.: US 11,727,756 B2
(45) Date of Patent: *Aug. 15, 2023

(54) DYNAMICALLY VARIABLE ADVERTISING INCENTIVE REWARDS IN ONLINE GAMES

(71) Applicant: Zynga Inc., San Francisco, CA (US)

(72) Inventors: Joshua Marc Burgin, Seattle, WA (US); Diwakar Gupta, Seattle, WA (US); Simon Asselin, Sammamish, WA (US)

(73) Assignee: Zynga Inc., San Francisco, CA (US)

(*) Notice: Subject to any disclaimer, the term of this patent is extended or adjusted under 35 U.S.C. 154(b) by 78 days.

This patent is subject to a terminal disclaimer.

(21) Appl. No.: 17/110,012

(22) Filed: Dec. 2, 2020

(65) Prior Publication Data

US 2021/0233357 A1 Jul. 29, 2021

Related U.S. Application Data

(63) Continuation of application No. 15/812,769, filed on Nov. 14, 2017, now Pat. No. 10,878,661, which is a continuation of application No. 15/184,461, filed on Jun. 16, 2016, now Pat. No. 9,846,992, which is a continuation of application No. 14/228,432, filed on Mar. 28, 2014, now Pat. No. 9,396,608.

(Continued)

(51) Int. Cl.
*G07F 17/34* (2006.01)
*G07F 17/32* (2006.01)
(Continued)

(52) U.S. Cl.
CPC ..... *G07F 17/3255* (2013.01); *G06Q 30/0209* (2013.01); *G06Q 30/0277* (2013.01); *G06Q 50/01* (2013.01); *G07F 17/3239* (2013.01)

(58) Field of Classification Search
CPC .................. G07F 17/32; G07F 17/3255
See application file for complete search history.

(56) References Cited

U.S. PATENT DOCUMENTS 8,065,702 B2  11/2011  Goldberg et al.
9,396,608 B2   7/2016  Burgin et al.
(Continued)

OTHER PUBLICATIONS

U.S. Appl. No. 14/228,432 U.S. Pat. No. 9,396,608, filed Mar. 28, 2014, Dynamically Variable Advertising Incentive Rewards in Online Games.

(Continued)

*Primary Examiner* — David L Lewis
*Assistant Examiner* — Shauna-Kay Hall
(74) *Attorney, Agent, or Firm* — Schwegman Lundberg & Woessner, P.A.

(57) ABSTRACT

A system and method for managing a computer-implemented online game provides dynamically variable rewards to incentivize player interaction with sponsored content presented within the game. The particular reward offered to incentivize player interaction with particular sponsored content (e.g., a particular advertisement) can be dynamically variable based on the attributes of the player, thus providing user-specific custom rewards for interaction with sponsored content. Properties of incentive rewards that may be dynamically variable can include a custom type of in-game asset or resource, and/or a custom amount of a particular in-game asset or resource.

19 Claims, 9 Drawing Sheets

Related U.S. Application Data

(60) Provisional application No. 61/828,811, filed on May 30, 2013.

(51) Int. Cl.
  *G06Q 30/0241* (2023.01)
  *G06Q 50/00* (2012.01)
  *G06Q 30/0207* (2023.01)

(56) References Cited

U.S. PATENT DOCUMENTS

| | | | |
|---|---|---|---|
| 9,846,992 | B2 | 12/2017 | Burgin et al. |
| 10,878,661 | B2 | 12/2020 | Burgin et al. |
| 2006/0135232 | A1 | 6/2006 | Willis |
| 2007/0004519 | A1 | 1/2007 | Swart et al. |
| 2007/0072676 | A1 | 3/2007 | Baluja |
| 2008/0059304 | A1 | 3/2008 | Kimsey |
| 2008/0214301 | A1 | 9/2008 | Sandige et al. |
| 2008/0313038 | A1 | 12/2008 | Wajihuddin |
| 2009/0170608 | A1 | 7/2009 | Herrmann et al. |
| 2009/0247282 | A1 | 10/2009 | Cheng |
| 2009/0248524 | A1 | 10/2009 | Defoy et al. |
| 2011/0258024 | A1 | 10/2011 | Prince |
| 2011/0295667 | A1 | 12/2011 | Butler |
| 2012/0047017 | A1 | 2/2012 | Hernandez et al. |
| 2012/0122554 | A1 | 5/2012 | Paquet et al. |
| 2012/0157190 | A1 | 6/2012 | Hungate |
| 2012/0214568 | A1 | 8/2012 | Herrmann |
| 2013/0174045 | A1 | 7/2013 | Sarukkai et al. |
| 2014/0045589 | A1* | 2/2014 | Paradise ............ G07F 17/3223 463/29 |
| 2014/0358260 | A1 | 12/2014 | Burgin et al. |
| 2016/0300446 | A1 | 10/2016 | Burgin et al. |
| 2018/0068526 | A1 | 3/2018 | Burgin et al. |

OTHER PUBLICATIONS

U.S. Appl. No. 15/184,461 U.S. Pat. No. 9,846,992, filed Jun. 16, 2016, Dynamically Variable Advertising Incentive Rewards in Online Games.

U.S. Appl. No. 15/812,769 U.S. Pat. No. 10,878,661, filed Nov. 14, 2017, Dynamically Variable Advertising Incentive Rewards in Online Games.

"U.S. Appl. No. 14/228,432, Non Final Office Action dated Feb. 3, 2015", 14 pgs.

"U.S. Appl. No. 14/228,432, Non Final Office Action dated Jun. 29, 2015", 8 pgs.

"U.S. Appl. No. 14/228,432, Notice of Allowance dated Mar. 25, 2016", 11 pgs.

"U.S. Appl. No. 14/228,432, Response filed Jun. 3, 2015 to Non-Final Office Action dated Feb. 3, 2015", 8 pgs.

"U.S. Appl. No. 14/228,432, Response filed Sep. 29, 2015 to Non Final Office Action dated Jun. 29, 2015", 12 pgs.

"U.S. Appl. No. 15/184,461, Non Final Office Action dated Nov. 3, 2016", 8 pgs.

"U.S. Appl. No. 15/184,461, Notice of Allowance dated Aug. 14, 2017", 8 pgs.

"U.S. Appl. No. 15/184,461, Response filed Apr. 3, 2017 to Non Final Office Action dated Nov. 3, 2016", 8 pgs.

"U.S. Appl. No. 15/812,769, Final Office Action dated May 1, 2020", 24 pgs.

"U.S. Appl. No. 15/812,769, First Action Interview—Office Action Summary dated Sep. 21, 2018", 3 pgs.

"U.S. Appl. No. 15/812,769, First Action Interview—Pre-Interview Communication dated Jun. 29, 2018", 3 pgs.

"U.S. Appl. No. 15/812,769, Non Final Office Action dated May 31, 2019", 17 pgs.

"U.S. Appl. No. 15/812,769, Notice of Allowance dated Aug. 26, 2020", '10 pgs.

"U.S. Appl. No. 15/812,769, Respnose filed Jan. 21, 2019 to First Action Interview dated Sep. 21, 2018", 13 pgs.

"U.S. Appl. No. 15/812,769, Response filed Aug. 3, 2020 to Final Office Action dated May 1, 2020", 11 pgs.

"U.S. Appl. No. 15/812,769, Response Filed Oct. 31, 2019 to Non Final Office Action dated May 31, 2019", 11 pgs.

"Lockers.com | Metal Lockers | Wood Lockers | Plastic Lockers", [Online]. Retrieved from the Internet: <URL: http://www.lockers.com>, (Accessed Feb. 18, 2013), 2 pgs.

\* cited by examiner

DYNAMICALLY VARIABLE ADVERTISING INCENTIVE REWARDS IN ONLINE GAMES

CROSS-REFERENCE TO RELATED APPLICATIONS

This application is a continuation of U.S. patent application Ser. No. 15/812,769, filed Nov. 14, 2017, now issued as U.S. Pat. No. 10,878,661, which is a continuation of U.S. Patent application Ser. No. 15/184,461, filed on Jun. 16, 2016, now issued as U.S. Pat. No. 9,846,992, which is a continuation of U.S. patent application Ser. No. 14/228,432, filed on Mar. 28, 2014, now issued as U.S. Pat. No. 9,396,608, which claims the benefit of priority to U.S. Provisional Application Ser. No. 61/828,811, filed on May 30, 2013, which applications are incorporated herein by reference in their entireties.

FIELD

The present disclosure generally relates to computer-implemented games. The disclosure also relates to presenting sponsored content, such as advertising content, within an online game.

BACKGROUND

Many online games present advertisements and other promotional content or sponsored content to players of the online games. For example, some online games may display static or dynamic advertisements within the game.

Some sponsored content may be interactive and may be associated with corresponding rewards, so that user interaction with the content is a condition for achieving a corresponding reward. In this way, active player engagement with the sponsored content is promoted, improving exposure of a brand or product promoted in the sponsored content.

BRIEF DESCRIPTION OF THE DRAWINGS

The example embodiments are illustrated by way of example, and not limitation, in the figures of the accompanying drawings, in which like reference numerals indicate the same or similar elements unless otherwise indicated.

DESCRIPTION OF EXAMPLE EMBODIMENTS

Overview

Figure 1:
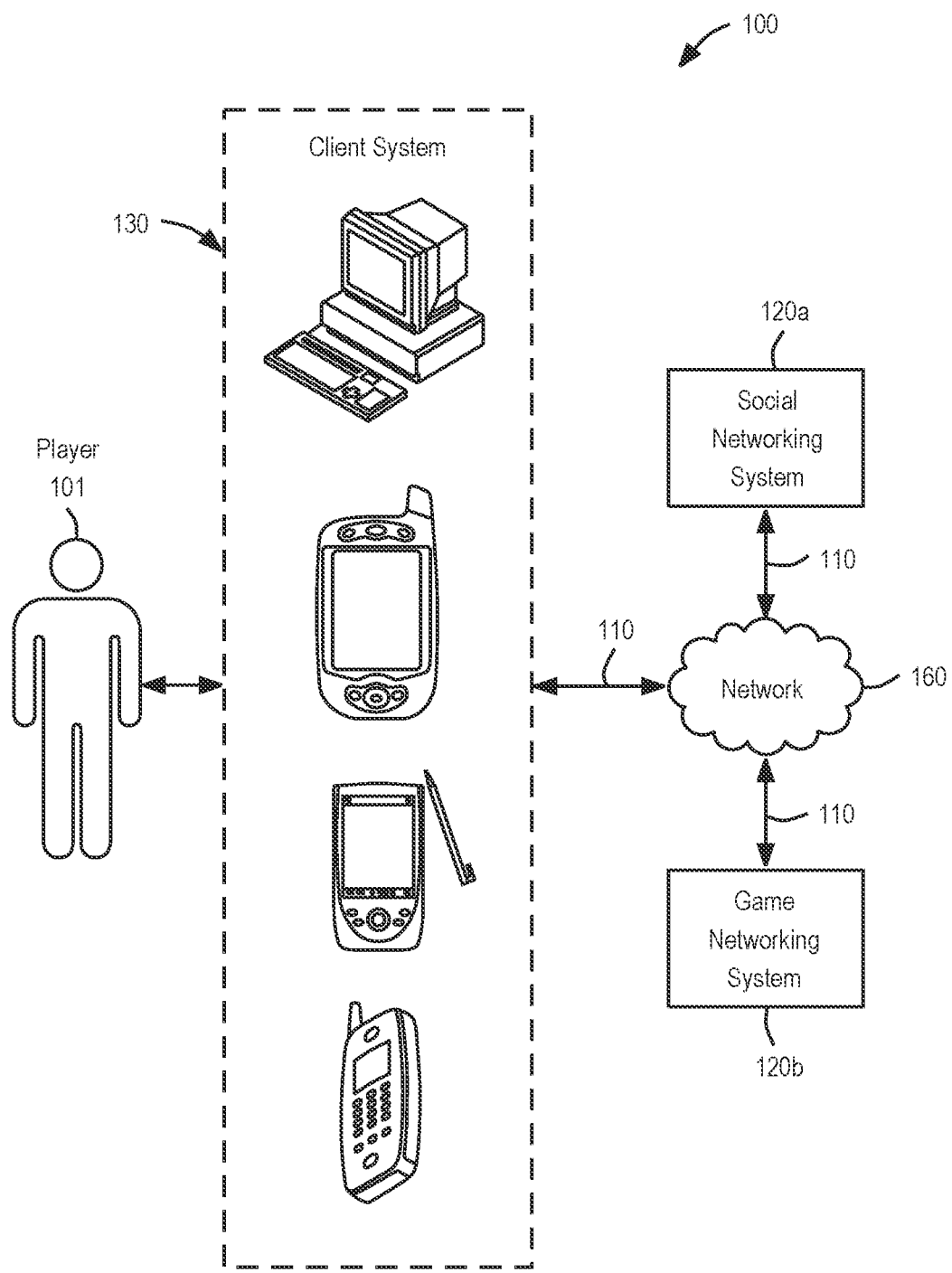
FIG. 1 shows a schematic diagram of a virtual gaming system, according to some example embodiments.

Example embodiments described below disclose systems and methods for providing dynamically variable rewards to players of an online game. In some example embodiments, the systems and methods identify and/or determine attributes or characteristics (e.g., playing history, current game play status, advertisement interaction history, and so on) for a player, and provide rewards to the player based on the determined characteristics, such as by providing rewards to the player based on actions (e.g., watching or interacting with an advertisement) performed by the player within or associated with the online game. The particular reward offered to incentivize player interaction with particular sponsored content (e.g., a particular advertisement) may thus be dynamically variable based on the attributes of the player, thereby providing user-specific custom rewards for interaction with sponsored content.

The method may comprise identifying sponsored content for in-game presentation to a player of a computer-implemented game, identifying an attribute of the player, and determining a custom property of an in-game reward associated with the sponsored content, based at least in part on the player attribute. The method may further comprise offering to the player the in-game reward as incentive for interaction with the sponsored content, the offered reward having the custom reward property.

Note that, as used herein, determining/identifying/calculating an attribute means determining/identifying/calculating an attribute value applicable to the user for a corresponding characteristic or attribute type. For example, if the relevant player attribute type is a player engagement level, then determining the attribute of the player may comprise determining whether the player's player engagement level is low, medium, or high. Likewise, in cases where the relevant player attribute is the player's geographic location, determining the attribute may comprise identifying the player's physical location.

Similarly, determining/calculating/selecting a property of the in-game reward means determining/calculating/selecting a value for a particular type of property of the reward. In some cases, for example, the reward property type comprises a particular type of in-game benefit or asset. In such a case, determining the custom reward property may comprise selecting a custom type of in-game benefit or asset from a predetermined plurality of benefit types. For example, determining the custom reward property may comprise determining whether the in-game reward associated with a particular advertisement comprises energy boosts for the player's player character, a particular in-game object having gameplay functionalities, or a virtual currency bonus. Instead, or in addition, the property type for the reward may be a quantum or amount of an associated in-game benefit. In such a case, determining the custom reward property may comprise determining a customized quantum of the in-game benefit. For example, determining a custom reward property may comprise automated calculation of a digital number of energy boosts to be offered to the player as an incentive for interacting with a particular advertisement.

The method may include calculating an interaction probability for the player based on one or more player attributes (in some embodiments based on a predetermined set of attributes), the interaction probability indicating an estimated or predicted likelihood that the player will perform an interactive activity upon which awarding of the incentive reward is conditional. The custom reward property may be determined as a factor of the calculated interaction probability.

In one example, determining a customized quantum for in-game assets offered as the incentive reward comprises adjusting a base value for rewards associated with the sponsored content as a function of the calculated interaction probability. Note that the base value may be specific to particular sponsored content, and/or may be specific to a game context in which the sponsored content is presented. Thus, for example, particular interactive sponsored content that a participant is presented with at a particular friction point in the game fiction may have a corresponding base value, with one or more properties of a user-specific custom reward offered to the player being based on one or more player attributes of the relevant player. In some example embodiments, the automated adjustment is such that the value of the custom reward has an inverse relationship to the calculated interaction probability. A more valuable incentive reward may thus be offered to a player who has a relatively lower interaction probability, and a different, less valuable incentive reward offered to another player who has a relatively higher interaction probability.

In one example embodiment, one or more reward properties are determined based on empirical data regarding historical in-game behavior of players with respect to interactive sponsored content. Such historical interaction data may be compiled by monitoring gameplay of multiple players on an ongoing basis, so that the historical interaction data comprises a dynamically updated historical database of player interaction with sponsored content. The historical database may include linked information regarding: (a) outcomes of respective instances of interactive sponsored content presentation within the game (e.g., whether or not the relevant player interacted with the presented sponsored content, and whether or not the relevant interaction activity was completed); (b) respective values for a corresponding set of player attributes at the time of sponsored content presentation (e.g., the relevant player's interaction history at the time, the player's game state at the time, the player's gameplay history at the time, and so forth); and/or (c) properties of an incentive reward offered at the time for interaction with the sponsored content.

The calculation of the interaction probability for a particular player may be performed by automated statistical analysis of the historical interaction data based on one or more player attributes of a targeted player. The calculation may, for example, comprise calculating a statistical approximation of a historical rate of interaction with sponsored content by players having respective sets of historical attributes substantially corresponding or analogous to the current set of attributes of the target player. In such cases, the system may be configured to monitor in-game behavior of players, and the method may comprise monitoring such behavior and compiling the historical interaction data based on the monitoring.

These and other example embodiments are described, by way of example, in further detail below.

Example Systems

FIG. 1 illustrates an example of a system 100 for implementing various disclosed embodiments. In particular embodiments, the system 100 comprises a player 101, a social networking system 120*a*, a game networking system 120*b*, a client system 130, and a network 160. The components of the system 100 may be connected to each other in any suitable configuration, using any suitable type of connection. The components may be connected directly or over the network 160, which may be any suitable network. For example, one or more portions of the network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

The social networking system 120*a* may be a network-addressable computing system that can host one or more social graphs. The social networking system 120*a* may generate, store, receive, and transmit social networking data. The social networking system 120*a* may be accessed by the other components of the system 100 either directly or via the network 160. The game networking system 120*b* is a network-addressable computing system that may host one or more online games. The game networking system 120*b* may generate, store, receive, and transmit game-related data, such as, for example, game account data, game input, game state data, and game displays. The game networking system 120*b* may be accessed by the other components of the system 100 either directly or via the network 160. The player 101 may use the client system 130 to access, send data to, and receive data from the social networking system 120*a* and the game networking system 120*b*. The client system 130 may access the social networking system 120*a* or the game networking system 120*b* directly, via the network 160, or via a third-party system. For example, the client system 130 may access the game networking system 120*b* via the social networking system 120*a*. The client system 130 may be any suitable computing device, such as a personal computer, laptop, cellular phone, smart phone, computing tablet, and so on.

The components of the system 100 may be connected to each other using any suitable connections 110. For example, the suitable connections 110 may include wireline (e.g., Digital Subscriber Line (DSL) or Data Over Cable Service Interface Specification (DOCSIS)), wireless (e.g., Wi-Fi or Worldwide Interoperability for Microwave Access (WiMAX)) or optical (e.g., Synchronous Optical Network (SONET) or Synchronous Digital Hierarchy (SDH)) connections. One or more connections 110 may include an ad hoc network, an intranet, an extranet, a VPN, a LAN, a WLAN, a WAN, a WWAN, a MAN, a portion of the Internet, a portion of the PSTN, a cellular telephone network, another type of connection, or a combination of two or more such connections. The connections 110 need not necessarily be the same throughout the system 100. One or more first connections 110 may differ in one or more respects from one or more second connections 110.

In an online computer game, a game engine manages a game state of the game. The game state comprises all game play parameters, including player character state, non-player character state, in-game object state, game world state (e.g., internal game clocks, game environment), and other game play parameters. Each player 101 controls one or more player characters (PCs). The game engine controls all other aspects of the game, including non-player characters (NPCs) and in-game objects. The game engine also manages the game state, including the player character state for currently active (online) and inactive (offline) players.

An online game may be hosted by the game networking system 120b, which can be accessed using any suitable connection 110 with a suitable client system 130. A player 101 may have a game account on the game networking system 120b, wherein the game account can contain a variety of information associated with the player 101 (e.g., the player's personal information, financial information, purchase history, player character state, and game state). In some example embodiments, the player 101 may play multiple games on the game networking system 120b, which may maintain a single game account for the player 101 with respect to all the games, or multiple individual game accounts for each game with respect to the player 101. In some example embodiments, the game networking system 120b may assign a unique identifier to each player 101 of an online game hosted on the game networking system 120b. The game networking system 120b may determine that a player 101 is accessing the online game by reading the user's cookies, which may be appended to HTTP requests transmitted by the client system 130, and/or by the player 101 logging onto the online game.

In some example embodiments, the player 101 may access an online game and control the game's progress via the client system 130 (e.g., by inputting commands to the game at the client device). The client system 130 may display the game interface, receive inputs from the player 101, transmit user inputs or other events to the game engine, and receive instructions from the game engine. The game engine can be executed on any suitable system (e.g., the client system 130, the social networking system 120a, and/or the game networking system 120b). For example, the client system 130 may download client components of an online game, which are executed locally, while a remote game server, such as the game networking system 120b, provides backend support for the client components and may be responsible for maintaining application data of the game, processing the inputs from the player 101, updating and/or synchronizing the game state based on the game logic and each input from the player 101, and transmitting instructions to the client system 130. As another example, each time the player 101 provides an input to the game through the client system 130 (e.g., by typing on the keyboard or clicking the mouse of client system 130), the client components of the game may transmit the player's input to the game networking system 120b.

In an online multiplayer game, players may control player characters (PCs), a game engine controls non-player characters (NPCs) and game features, and the game engine also manages player character state and game state and tracks the state for currently active (i.e., online) players and currently inactive (i.e., offline) players. A player character can have a set of attributes and a set of friends associated with the player character. As used herein, a term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), and so forth. The game engine may use the player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player 101.

In some example embodiments, the player 101 may access particular game instances of an online game. A game instance is a copy of a specific game play area that is created during runtime. In some example embodiments, a game instance is a discrete game play area where one or more players 101 may interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible only by specific players) or non-exclusive (i.e., accessible by any player). In some example embodiments, a game instance is populated by one or more player characters controlled by one or more players 101 and one or more in-game objects controlled by the game engine. When accessing an online game, the game engine may allow the player 101 to select a particular game instance to play from a plurality of game instances. Alternatively, the game engine may automatically select the game instance that the player 101 will access. In some example embodiments, an online game comprises only one game instance that all players 101 of the online game can access.

In some example embodiments, a specific game instance may be associated with one or more specific players 101. A game instance is associated with a specific player 101 when one or more game parameters of the game instance are associated with the specific player 101. For example, a game instance associated with a first player 101 may be named "First Player's Play Area." This game instance may be populated with the first player's player character and one or more in-game objects associated with the first player 101. In some example embodiments, a game instance associated with a specific player 101 may only be accessible by that specific player 101. For example, a first player 101 may access a first game instance when playing an online game, and this first game instance may be inaccessible to all other players 101. In other embodiments, a game instance associated with a specific player 101 may be accessible by one or more other players, either synchronously or asynchronously with the specific player's game play. For example, a first player 101 may be associated with a first game instance, but the first game instance may be accessed by all first-degree friends in the first player's social network. In some example embodiments, the game engine may create a specific game instance for a specific player 101 when that player 101 accesses the game. For example, the game engine may create a first game instance when a first player 101 initially accesses an online game, and that same game instance may be loaded each time the first player 101 accesses the game. Alternatively, for example, the game engine may create a new game instance each time a first player 101 accesses an online game, wherein each game instance may be created randomly or selected from a set of predetermined game instances. In some example embodiments, the set of in-game actions available to a specific player 101 may be different in a game instance that is associated with that player 101 compared to a game instance that is not associated with that player 101. The set of in-game actions available to a specific player in a game instance associated with that player 101 may be a subset, a superset, or independent of the set of in-game actions available to that player 101 in a game instance that is not associated with him. For example, a first player 101 may be associated with Blackacre Farm in an online farming game. The first player 101 may be able to plant crops on Blackacre Farm. If the first player 101 accesses a game instance associated with another player 101, such as Whiteacre Farm, the game engine may not allow the first player 101 to plant crops in that game instance. However, other in-game actions may be available to the first player 101, such as watering or fertilizing crops on Whiteacre Farm.

In some example embodiments, a game engine can interface with a social graph. Social graphs are models of connections between entities (e.g., individuals, users, contacts, friends, players, player characters, non-player characters, businesses, groups, associations, concepts, and the like). These entities are considered "users" of the social graph; as such, the terms "entity" and "user" may be used interchangeably when referring to social graphs herein. A social graph can have a node for each entity and edges to represent relationships between entities. A node in a social graph can represent any entity. In some example embodiments, a unique client identifier can be assigned to each user in the social graph. This disclosure assumes that at least one entity of a social graph is a player or player character in an online multiplayer game, though this disclosure includes any suitable social graph users.

The minimum number of edges with which a player (or player character) can be connected to another user is considered the degree of separation between them. For example, where the player and the other user are directly connected (one edge), they are deemed to be separated by one degree of separation. The other user would be a so-called "first-degree friend" of the player. Where the player and the other user are connected through one other user (two edges), they are deemed to be separated by two degrees of separation. This user would be a so-called "second-degree friend" of the player. Where the player and the other user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within $N_{max}$ degrees of the player, where $N_{max}$ is the maximum degree of separation allowed by the system managing the social graph (e.g., the social networking system 120*a* or the game networking system 120*b*). In some example embodiments, $N_{max}$ equals 1, such that the player's social network includes only first-degree friends. In some example embodiments, $N_{max}$ is unlimited and the player's social network is coextensive with the social graph.

In some example embodiments, the social graph is managed by the game networking system 120*b*, which is managed by the game operator. In other embodiments, the social graph is part of a social networking system 120*a* managed by a third party (e.g., Facebook®, Friendster, Myspace). In other embodiments, the player 101 has a social network on both the game networking system 120*b* and the social networking system 120*a*, wherein the player 101 can have a social network on the game networking system 120*b* that is a subset, a superset, or independent of the player's social network on the social networking system 120*a*. In such combined systems, the game networking system 120*b* may maintain social graph information with edge type attributes that indicate whether a given friend is an "in-game friend," an "out-of-game friend," or both. The various embodiments disclosed herein are operable when the social graph is managed by the social networking system 120*a*, the game networking system 120*b*, or both.

Figure 2:
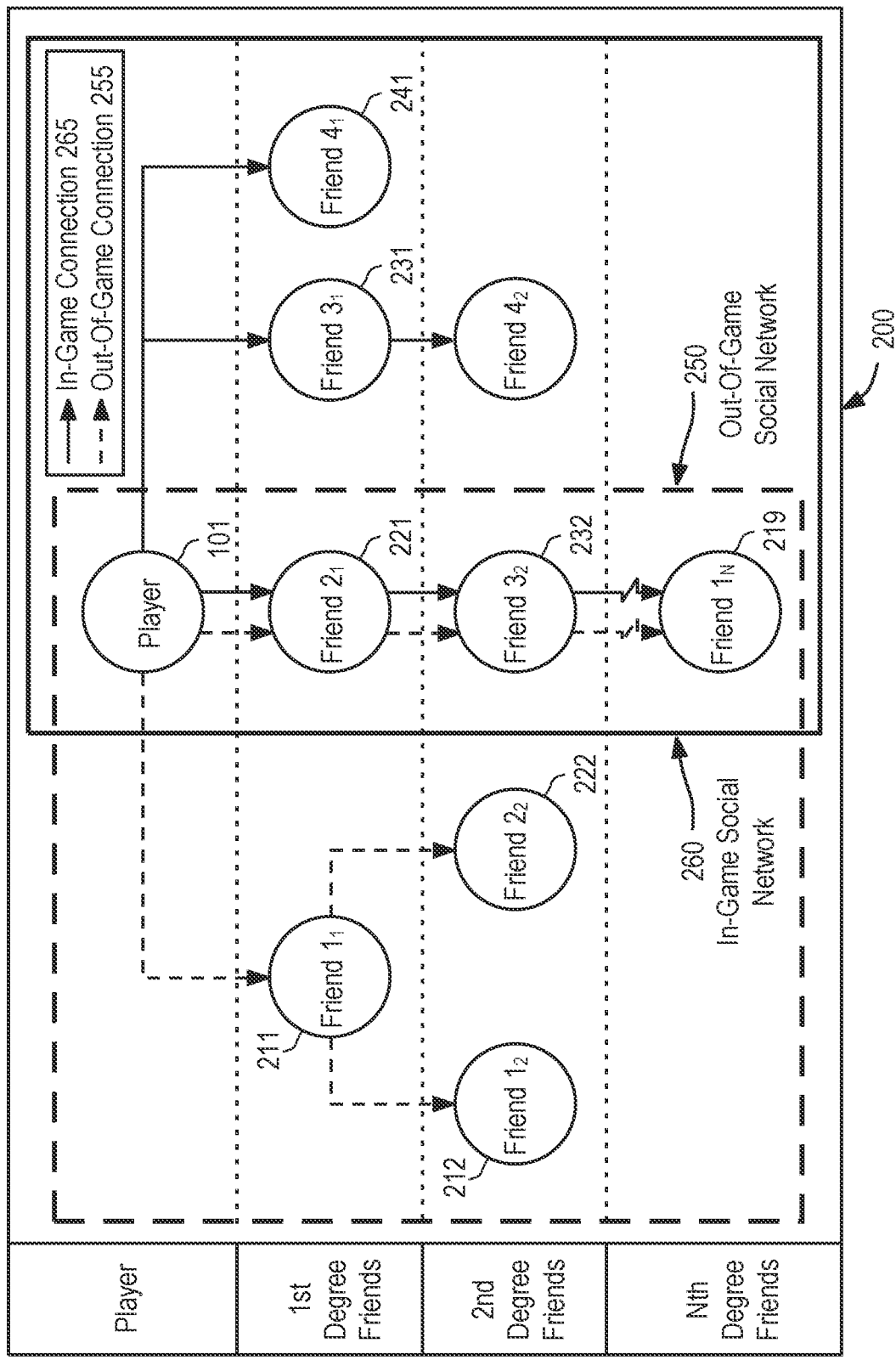
FIG. 2 shows a social network within a social graph, according to some example embodiments.

FIG. 2 shows an example of a social network 200 within a social graph. As shown, Player 101 can be associated, connected, or linked to various other users, or "friends," within an out-of-game social network 250. These associations, connections, or links can track relationships between users within the out-of-game social network 250 and are commonly referred to as online "friends" or "friendships" between users. Each friend or friendship in a particular user's social network within a social graph is commonly referred to as a "node." For purposes of illustration and not by way of limitation, the details of the out-of-game social network 250 will be described in relation to Player 101. As used herein, the terms "player" and "user" can be used interchangeably and can refer to any user or user-controlled character in an online multiuser game system or social networking system. As used herein, the term "friend" can mean any node within a player's social network.

As shown in FIG. 2, Player 101 has direct connections with several friends. When Player 101 has a direct connection with another individual, that individual is referred to as a first-degree friend. In the out-of-game social network 250, Player 101 has two first-degree friends. That is, Player 101 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that, in the out-of-game social network 250, Player 101 has three second-degree friends to which he is connected via his connection to his first-degree friends. Second-degree Friend $1_2$ 212 and Friend $2_2$ 222 are connected to Player 101 via his first-degree Friend $1_1$ 211, and Friend $3_2$ 232 is connected to Player 101 via his first-degree Friend $2_1$ 221. The limit on the depth of friend connections, or the number of degrees of separation for associations, that Player 101 is allowed is typically dictated by the restrictions and policies implemented by the social networking system 120*a*.

In some example embodiments, Player 101 can have Nth-degree friends connected to him through a chain of intermediary degree friends as indicated in FIG. 2. For example, Nth-degree Friend $1_N$ 219 is connected to Player 101 via second-degree Friend $3_2$ 232 and one or more other higher-degree friends. Various embodiments may take advantage of and utilize the distinction between the various degrees of friendship relative to Player 101.

In some example embodiments, a player (or player character) may have a social graph within an online multiplayer game that is maintained by the game engine and another social graph maintained by a separate social networking system. FIG. 2 depicts an example of an in-game social network 260 and the out-of-game social network 250. As discussed herein, Player 101 has out-of-game connections 255 to a plurality of friends, forming the out-of-game social network 250. Here, Friend $1_1$ 211 and Friend 21221 are first-degree friends with Player 101 in his out-of-game social network 250. Player 101 also has in-game connections 265 to a plurality of players, forming the in-game social network 260. That is, Friend $2_1$ 221, Friend $3_1$ 231, and Friend $4_1$ 241 are first-degree friends with Player 101 in his in-game social network 260. In some embodiments, it is possible for a friend to be in both the out-of-game social network 250 and the in-game social network 260. For example, Friend $2_1$ 221 has both an out-of-game connection 255 and an in-game connection 265 with Player 101, such that Friend $2_1$ 221 is in both Player 101's in-game social network 260 and Player 101's out-of-game social network 250.

As with other social networks, Player 101 may have second-degree and higher-degree friends in both his in-game and out-of-game social networks. In some embodiments, it is possible for Player 101 to have a friend connected to him both in his in-game and out-of-game social networks, wherein the friend is at different degrees of separation in each network. For example, if Friend $2_2$ 222 had a direct in-game connection with Player 101 (not shown), Friend $2_2$ 222 would be a second-degree friend in Player 101's out-of-game social network, but a first-degree friend in Player 101's in-game social network. In particular embodiments, a game engine can access the in-game social network 260, the out-of-game social network 250, or both.

In some example embodiments, the connections in a player's in-game social network can be formed both explicitly (e.g., users "friend" each other) and implicitly (e.g., the system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Example of Integrated In-Game Advertisement Platform

In some example embodiments, the systems and methods described herein provide an integrated interface to different advertisement providers, in order to provide a single player experience/interaction between users/players of online games and the presented advertisements, among other benefits. The systems and methods may present advertisements and other sponsored content or promotional material in various formats, such as JPEG, video, HTML5, and so on. For example, different media inputs are converted to a single user interface (UI) to provide a uniform, transparent experience to the player. That is, the entire player experience, from load to completion (and any interaction with the media, such as rewards), may take place within a single UI, or within a linked series of UIs launched from within the game and having a look and feel common to regulation or default game UIs with which the player may interact during normal gameplay.

Figure 3:
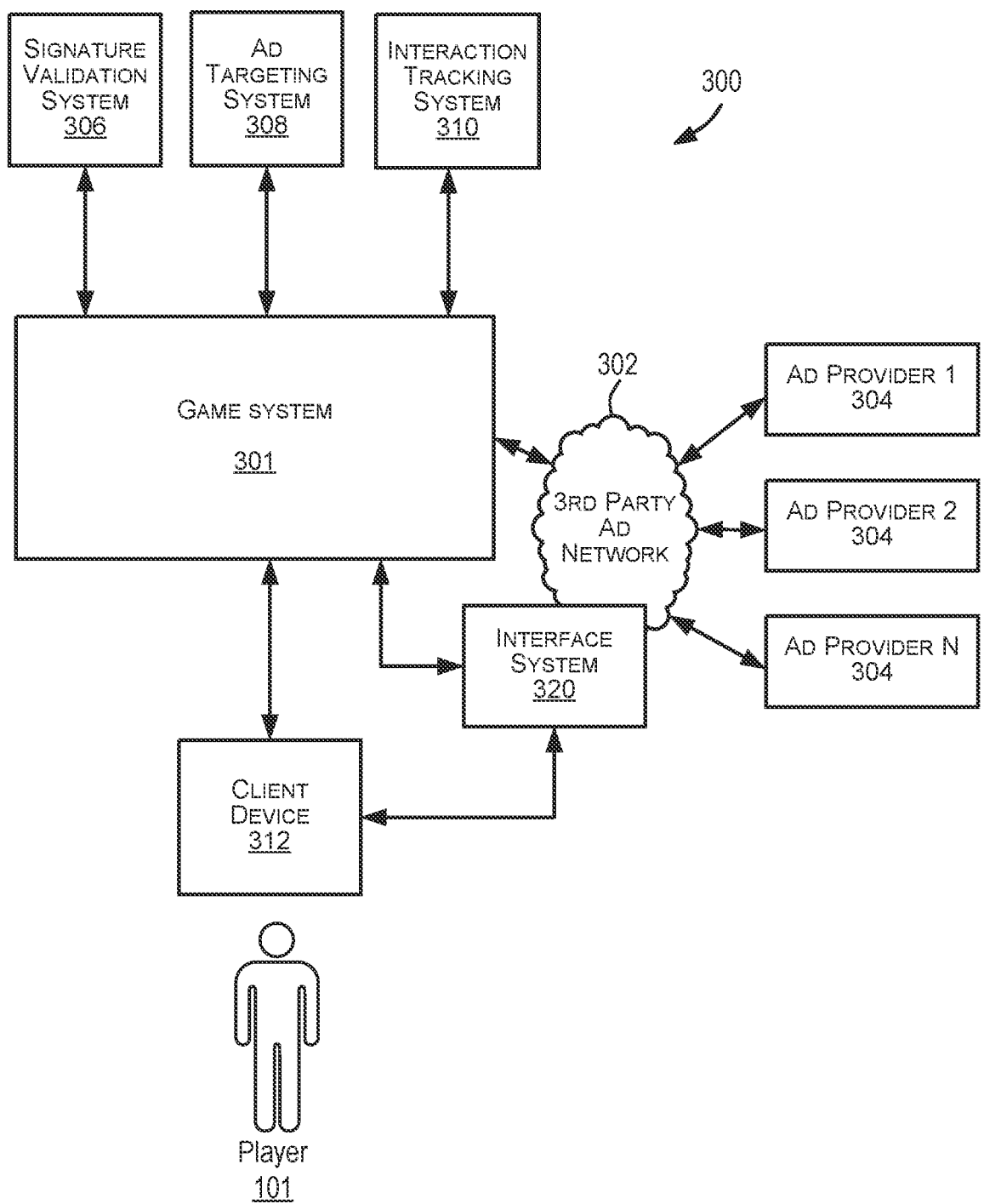
FIG. 3 is a block diagram illustrating an integrated in-game advertising platform, in some example embodiments.

FIG. 3 is a block diagram illustrating an integrated in-game advertising platform provided by a platform system 300, in accordance with one example embodiment. The system 300 may include a game system 301 (in this example embodiment comprising a game server) that communicates with a third party advertisement network 302 that is configured to provide advertisements or other sponsored content from various providers, further referred to as Ad Providers 304 (e.g., Ad Provider 1, Ad Provider 2, Ad Provider N), such as game sponsors and other sponsoring entities. The game system 301 and/or the advertisement network 302 may provide advertisements and other sponsored content to a client device 312, such as within or overlaying a game fiction of an online game provided by the game system 301. Note that, except where the context clearly mandates a different interpretation, or where the description is with respect to a specific example advertisement, the term "advertisement" or "advertising" is used broadly in the description that follows to include non-advertisement sponsored content. Such non-advertisement sponsored content may include, for example, customer surveys, themed mini-games, and the like.

The system 300 comprises various components that provide specific functionalities associated with in-game presentation and/or incentivization of sponsored content. In this example embodiment, at least some of these functionalities are provided by distributed systems communicatively coupled to the game system 301. It will be appreciated, however that the various functionalities may be provided in other embodiments by a more centralized game engine or game system 301, while, in other embodiments, the respective functionalities may be provided by a yet more distributed system.

in this example embodiment, the system 300 includes a signature validation system 306 configured to validate devices within the platform, an ad targeting system 308 configured to identify, target, and/or match advertisements to players viewing the advertisements, and/or an interaction tracking system 310 configured to track interactions of players with advertisements (or other sponsored content, as mentioned above) presented to players on respective client devices 312. The system 300 may further include an interface system 320 communicatively coupled to the 3rd party ad network 302, the client device 312, and the game system 301.

The following is an example of different components that may interact between the game system 301 and the interface system 320 associated with the third party advertisement network 302 in order to present sponsored content to players 101, for example to resolve friction points within online games based on the presentation of interactive advertisements. Note that many architectures alternative to that described below fall within the scope of this disclosure. Features of the interface system 320 may, for example, be integrated in the game system 301. Alternatively, the functions of the various processing components of FIG. 3 may be performed by distributed processing devices.

Once an online game is launched, the game system 301 may initialize Flash based on an initUser transaction. The game system 301 fetches targeting information from a targeting service, such as the ad targeting system 308. At the same time or in parallel, the game system 301 initializes the online game code (e.g., game HTML or JavaScript), by (1) fetching 3PAN playloads from a ZRuntime script, and (2) outputting an appropriate 3PAN payload into a page stream to create a 3PAN JavaScript module which can retrieve sponsored content from the third party advertisement network 302. At a friction point, the game system 301, via Flash, identifies available content. If available, the game system 301 presents an option to view the content, and when the player selects the option, the 3PAN payload calls a load function with a pointer to the div/frame that is rendering the retrieved content. Upon completion of a presentation of the content, the 3PAN payload transmits a "completed message" to the game system 301, and closes the content window. The game system 301 then resolves the friction point by granting energy or performing other transactions within the online game. Note that although the example embodiments are described as presenting interaction with sponsored content as a mechanism for resolution of friction points in the game fiction, aspects of the disclosure relating to dynamically variable rewards for interaction with sponsored content may in other embodiments be employed in combination with the presentation of sponsored content that is not associated with resolution of an in-game friction point.

In some example embodiments, displayed sponsored content may be in a rich-media format, and include a video piece along with a survey or quiz questions, although in some cases, the sponsored content may include arbitrary web content (pure video, display only, rich media, and so on). In some example embodiments, the game system 301 may utilize an IFrame window triggered from a Flash or HTML5 game client as the content placement mechanism.

In some example embodiments, the interface system 320 may provide an SDK that reduces in-game integration costs, among other things. The SDK may also provide uniform tracking and allow the interface system 320 to manage and onboard new advertisement networks and/or content providers without game studio development involvement. The system may also integrate with a targeting engine, such as the ad targeting system 308, providing the ability to target the sponsored content of respective sponsored activities in a sequence of activities themselves, as well as target in-game placements to different player segments based on their geography, demographics, behavior, and so on.

Figure 4:
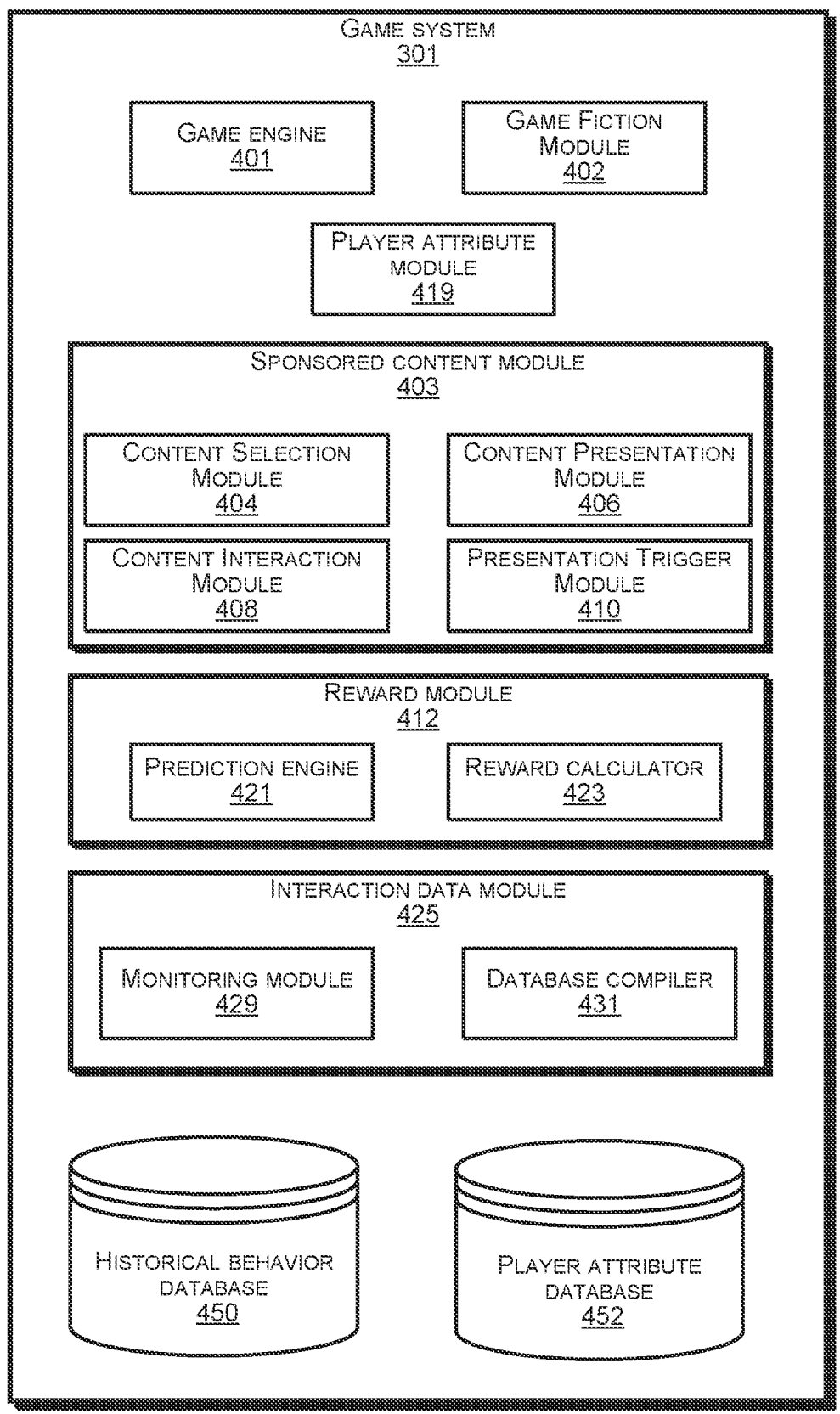
FIG. 4 is a block diagram illustrating a game system, in some example embodiments.

FIG. 4 is a block diagram illustrating the game system 301, in accordance with an example embodiment. The game system 301 may include various hardware and/or software modules, such as a game engine 401, a game fiction module 402, a player attribute module 419, a sponsored content module 403, a reward module 412, and an interaction data module 425. The sponsored content module 403 may comprise a content selection module 404, a content presentation module 406, a content interaction module 408, and a presentation trigger module 410. The reward module 412 may comprise a prediction engine 421 and a reward calculator 423. The interaction data module 425 may comprise a monitoring module 429 and a database compiler 431. The game system 301 may further comprise a historical behavior database 450 and a player attribute database 452. Respective functionalities of these components of the game system 301 will be evident from the description of the example methods performed by use of the example game system 301, as described with reference to FIGS. 5-7 below, with various method operations being performed by corresponding system components.

In some example embodiments, the game fiction module 402 is configured and/or programmed to receive an indication of an occurrence of a trigger event within a game fiction of an online game. For example, the game fiction module 402 may receive from the game system 301 an indication that a player of an online game has arrived at a friction point or pinch point within a game fiction, such as an occurrence of a player running out of energy, having a low or empty account of virtual currency, failing a task or quest within the online game, and so on. In some embodiments, the trigger event may comprise user selection of an option associated with presentation of interactive sponsored content comprising a sequence of sponsored activities. In such case, the presentation trigger module 410 may be configured to present a plurality of alternative options to the player in response to, for example, a friction point in the game fiction, one of the alternative options being associated with presentation of the interactive sponsored content. As mentioned above, some embodiments may provide for automatic adjustment of incentive rewards separate from the provision of a interactive sponsored content for a friction point resolution.

In some example embodiments, the content selection module 404 is configured and/or programmed to select interactive sponsored content from a group of content providers, to be presented to the player of the online game. For example, the content selection module 404 may select sponsored content (e.g., an interactive advertisement such as a video, quiz, and so on) from the Ad Providers 304, based on information received from the game system 301, such as information from the ad targeting system 308 that provides information associated with characteristics of a player playing the online game, a state of the online game, and so on.

In some example embodiments, the content presentation module 406 is configured and/or programmed to directly (or indirectly, via the game server) present the sponsored content to a user device associated with a player of an online game. For example, the content presentation module 406 directly presents the sponsored content to the client device 312 by overlaying the content over an online game provided by the game system 301 that is currently running on the client device 312.

In some embodiments, the reward module 412 is configured automatically to calculate a custom incentive reward that is to be offered to the player for predefined interaction with the selected sponsored content, with one or more properties of the incentive reward being determined as a function of one or more player attributes of the particular player to whom the sponsored content is to be presented.

In some example embodiments, the content interaction module 408 is configured and/or programmed to determine that the player of the online game has interacted with the presented sponsored content. For example, the content interaction module 408 may determine that a video has played or that a player has answered one or more questions from a displayed interactive quiz, may receive an indication from the game system 301 that the player has viewed the content, and so on.

Once it has been determined that the player has interacted with the presented sponsored content, the content interaction module 408 may transmit to the game system 301 an indication that the player has interacted with the presented sponsored content, and the reward module 412 may provide an in-game reward to the player based on player interaction with the presented sponsored content. In some embodiments, the reward may comprise resolution of the friction point in the game fiction.

Example Methods

Figure 5:
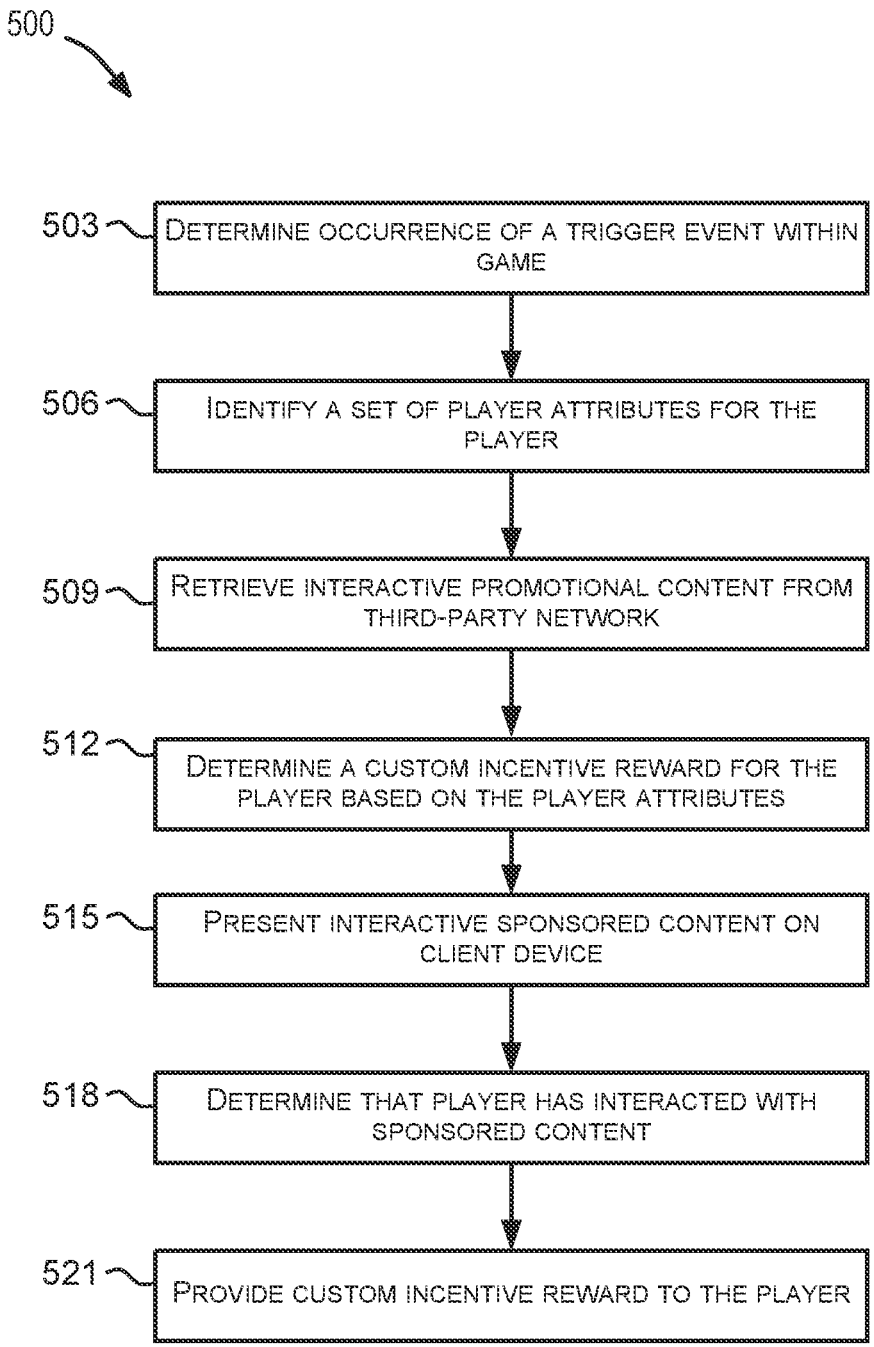
FIG. 5 is a flow diagram illustrating an example method for presenting sponsored content to a player of an online game, in some example embodiments.

FIG. 5 is a flow diagram illustrating an example embodiment of a method 500 for presenting sponsored content to a player of an online game. In operation 503, the game system 301 determines the occurrence of a trigger event within the game. In this example embodiment, the trigger event is a friction point or pinch point within a game fiction. For example, the game fiction module 402 may receive an indication from the game engine 401 that a player has reached a friction point or pinch point within a game fiction.

Example friction points may include running low or out of energy, running low or out of virtual currency, running low or out of time to complete a task or project within the game, failing to complete a task or project within the game, losing a competition within the online game, and so on. In other embodiments, friction points within the game fiction may comprise progression of a player to a particular point within the game fiction. In some cases, for example, a particular in-game challenge or impasse came be overcome only by user interaction with interactive sponsored content, as described below, so that arrival of the player at the predetermined point in the game fiction constitutes a trigger event that causes presentation of interactive sponsored content.

Trigger events can instead, or in addition, comprise user selection of an option to interact with sponsored content for associated rewards.

In operation 506, a set of player attributes is identified for use in determining a custom incentive reward for the player. In some example embodiments, the custom incentive reward may be determined based on a single player attribute. In this example embodiment, however, the player attribute module 419 is configured to identify respective values for a predetermined set of player attributes consisting of a plurality of player attributes is identified, at operation 506. In some embodiments, the set of player attributes may be limited to a predefined combination of attributes, which may be different for different use cases (e.g., having different sets of player attributes for determining reward properties for different types of sponsored content, for different friction points or progress points in the game fiction, for different types of players, or the like). In other embodiments, the player attribute module 419 is configured to retrieve and store respective values for as many player attributes as possible from a predefined comprehensive list of player attributes.

The player attributes may be based on the player's gameplay history, and/or the player's history of interacting with sponsored content. The set of player attributes may, for example, include a player type associated with the player, a player skill level, a current gameplay need for the player (e.g., one last virtual object or decoration to complete a set, a certain amount of currency to make a certain purchase, or the like), a previous reward history associated with the player, an activity level of the player, or the like. The player attributes may instead, or in addition, include the player's history of completing sponsored content activities (for example with available attribute values of never, usually, or always), the player's experience level regarding sponsored content (e.g., indicating a level of familiarity with in-game advertising and/or value exchange models), the player's engagement level in the game (for example with available attribute values of low, medium, or high), or a virality level for the player (indicating, for example, the player's historical propensity for performing sharing activities on social media for receiving incentive rewards). In some embodiments, one or more player attributes may be based on historical interaction behavior of the player's friends.

At operation 509, the game system 301 retrieves interactive sponsored content, e.g. from the 3rd party ad network 302. The particular sponsored content (e.g., the particular advertisement) that is retrieved for the player may be selected based at least in part on the set of player attributes. For example, the content selection module 404 may select and retrieve one or more of a plurality of interactive advertisements or other sponsored content (e.g., a video advertisement, an interactive quiz, or the like) from one of multiple content providers associated with the third party advertisement network 302.

At operation 512, a custom incentive reward is determined for the player based on the corresponding set of player attributes. For example, the game system 301 may select and/or generate a reward based on game play or game history attributes for the player. The selected reward may include various rewards described herein, such as virtual currency, energy, virtual objects, decorations, discounts on items for purchase or acquisition, and so on. Determination of the custom incentive reward may comprise determining a custom quantum (i.e., a particular number or amount) of in particular in-game asset based on the set of player attributes. Note that the quantum of the incentive reward for a particular advertisement is thus dynamically variable as a function of the corresponding player attributes, so that the game system 301 automatically provides a user-specific incentive reward based on the particular values of the set of player attributes. Thus, for example, the amount of virtual currency offer to the player as incentive for, e.g., watching a particular video ad may be different for different players, depending on the respective player attributes.

Instead, or in addition, the determining of the custom incentive reward for the player, at operation 512, may comprise an automated process for selecting a particular type of in-game asset to be offered as the incentive reward. The set of attributes may, for example, indicate that the player has just run out of a particular in-game resource (e.g., energy or cash), in response to which the offered incentive reward may be a particular amount of the depleted resource. Further aspects of automated determination of the custom incentive reward, at operation 512, are discussed later herein with reference to FIG. 6.

In operation 515, the game system 301 presents the retrieved sponsored content directly to a computing device associated with the relevant player. For example, the content presentation module 406 overlays a presentation of a retrieved advertisement on top of a currently running game within the client device 312. In this example embodiment, presenting the sponsored content, at operation 515, comprises displaying a user-selectable option for interacting with particular sponsored content, together with offering the custom incentive reward as an incentive for interacting with the sponsored content.

Figure 7:
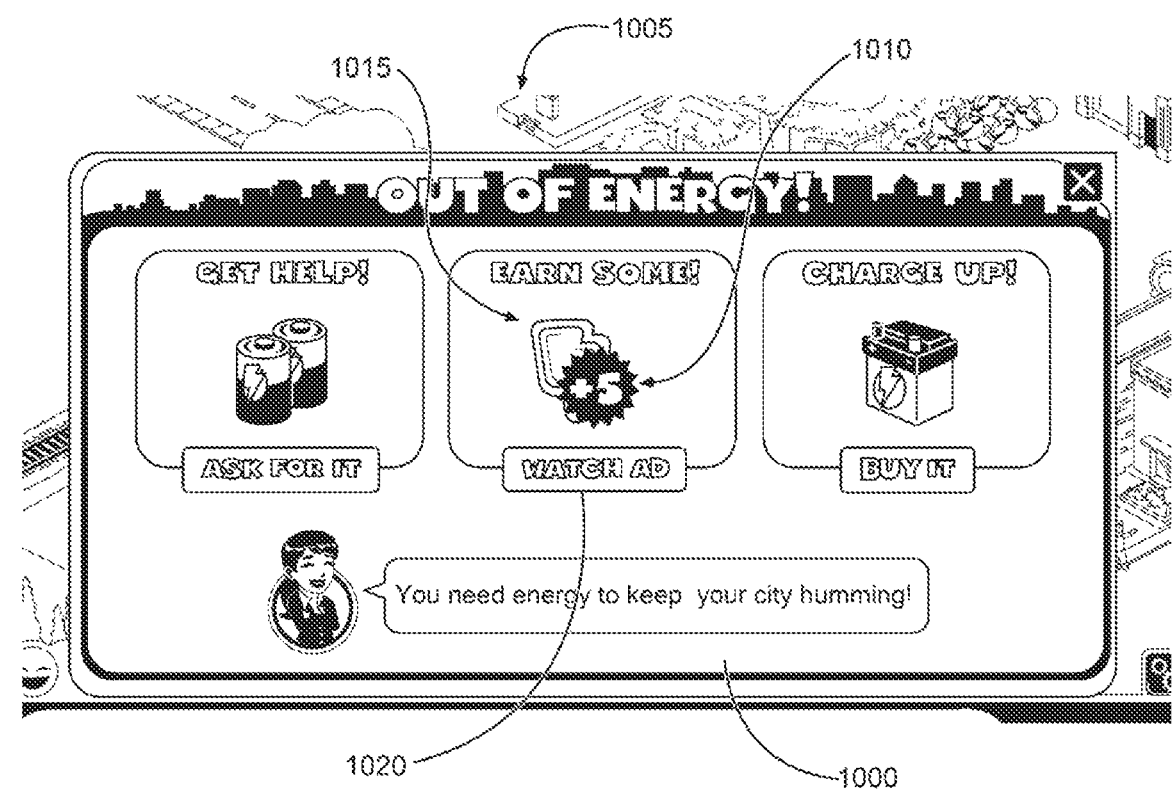
FIG. 7 is an example embodiment of a user interface for providing dynamic rewards to a player, in accordance with an example embodiment.

FIG. 7 shows an example embodiment of a user interface (UI) 1000 that may be displayed within a game interface 1005 showing a view of a gameboard (in this example embodiment a virtual in-game space consisting of the player's game instance, which is a virtual city developed and managed by the player). The UI 1000 includes an ad prompt 1020 that provides a user-selectable user interface element (in this example embodiment, a "watch ad" soft button) that can be selected by the player to launch an associated video ad. UI 1000 further includes a benefit type icon 1015 that indicates the type of benefit offered as incentive reward, in this example embodiment comprising energy boosts consumable by the player within game play. Note that the benefit may be a custom benefit type, selected based on the player's corresponding attributes. The UI 1000 further includes an amount icon 1010 that indicates a custom amount of the corresponding game resource (in this example indicating the number of energy boosts) that are offered as the incentive reward.

Returning now to FIG. 5, it can be seen that the method 500 includes determining, at operation 518, that the player has interacted with the sponsored content. In the example embodiment of FIG. 7, this may comprise determining that the player has selected the ad prompt provided by soft button 1020, and has played the corresponding video ad to completion.

In operation 521, the custom incentive reward is provided to the player in response to determining that the predefined player interaction has been completed. The value and/or type of in-game benefit provided to the player corresponds to the automatically determined, variable properties determined based on the player attributes, at operation 512. In the example embodiment of FIG. 7, the offered 5 energy boosts accrue to the player's energy balance.

In some example embodiments, the game system 301 and/or the game engine 401 may perform method 500 at various other times within a game fiction, such as other points within a game fiction that may require a player to perform a task or other action with an online game, at times when a player's status or associated metrics indicate a possible need for a reward (e.g., the player is running low on energy), or in response to player input triggering a sponsored content presentation process.

Figure 6:
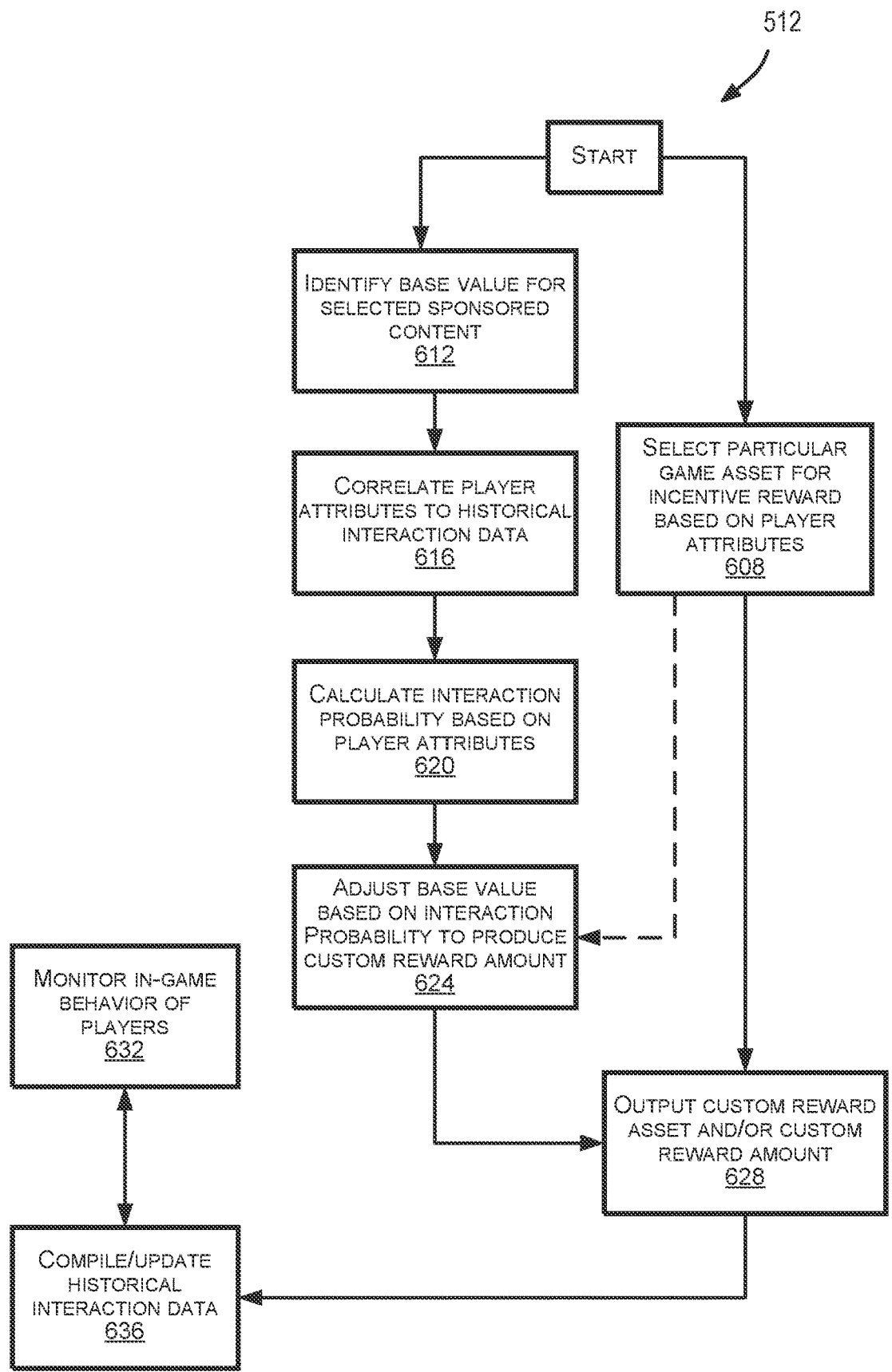
FIG. 6 is a flow diagram illustrating an example method for providing dynamic rewards to a player of an online game, in some example embodiments.

FIG. 6 shows a flowchart 512 of an example embodiment of a method for determining one or more custom properties for an incentive reward based on player attributes, so that flowchart 512, in this example, illustrates an expanded view of a series of operations or steps which together constitute the operation or process represented by block 512 in the flowchart 500 of FIG. 5.

At operation 608, a custom type of in-game benefit is selected for use as incentive reward, based on one or more of the player attributes. This may comprise a particular game asset from a predefined set of available game assets that are available for use as incentive rewards.

In some example embodiments, selection of the reward asset, at operation 608, may be based on identifying in-game needs of the player based on the player attributes, which may include game state information. If, for example, the player attributes indicate that the player is a regular consumer of, say, a strawberry resource and is running low on that resource, the game system 301 may automatically select strawberry resources as the type of in-game asset for the incentive reward. In one example embodiment, the game system 301 is configured to identify which resource the player consumes most heavily from the set comprising strawberries, hay, and water. In response to determining the most heavily consumed resource, that resource is selected as the custom reward asset.

In another example embodiment, it may be determined from the identified player attributes how regularly the player spends out-of-game currency for acquiring a specific in-game resource, for example in-game currency. If it is determined that the player regularly buys in-game currency, then the game asset may be selected as a resource other than in-game currency.

Instead, or in addition, the particular quantum or amount of in-game assets for the incentive reward may be calculated. This may comprise, at operation 612, identifying a base value for the selected sponsored content that is to be incentivized with an associated reward. Each advertisement may, for example, have a specific associated base value that indicates a default reward value. Instead, or in addition, the default value may attach to a particular point in the game fiction. The default reward value may be quantified in terms of the associated reward asset (which may in some instances be a custom game asset selected at operation 608, or may in other instances be a non-variable game asset associated with the sponsored content and/or with the relevant point in the game fiction).

At operation 616, the identified player attributes are correlated to the historical interaction data in order to calculate, at operation 620, an interaction probability that indicates a quantified likelihood that the player will interact with the selected sponsored content. The calculation of interaction probability thus comprises performing statistical analysis of historical interaction data for players to estimate a historical rate of interaction with sponsored content by players whose player attributes correspond to or are analogous to the set of attributes for the player. Defined differently, the calculation of interaction probability comprises predicting a likelihood of player interaction based on empirical historical data. The statistical analysis may comprise clustering analysis on data collected progress points in the game system 301, and joining that data with existing ad inventory and real-time user play.

In this example embodiment, the statistical modeling or analysis with respect to the historical interaction data produces a numerical value between zero and one that indicates the interaction probability for the player based on the current player attributes. It will be appreciated that an interaction probability value of zero indicates a 0% likelihood of interaction, while an interaction probability value of one indicates a 100% likelihood of interaction.

At operation 624, the relevant base value is adjusted based on the calculated interaction probability, to produce a customized quantum or custom reward amount for the incentive reward. In this example embodiment, the adjustment of the base value comprises modification of the base value by a reward multiplier. The modification in this example is inversely related to the calculated interaction probability, so that the less likely a player is to interact with the sponsored content, the greater is the value of the offered incentive reward. In one example embodiment, adjustment of the base value is in accordance with a three-banded adjustment mechanism illustrated by the table below, for an instance in which the base value is 6 units of the relevant reward asset.

| Interaction probability | 0-0.33 | 0.34-0.66 | 0.67-1 |
| --- | --- | --- | --- |
| Reward Multiplier | 3× | 2× | 1× |
| Base Reward | 6 | 6 | 6 |
| Total Reward | 18 | 12 | 6 |

At operation 628, the automatically determined custom reward assets and/or custom reward amount are delivered for use in an ad prompt that displays the custom incentive reward information on the client device 312.

The method 512 may further include monitoring the in-game behavior of players of the game, at operation 632, and compiling, at operation 636, historical interaction data, for example to produce the historical behavior database 450 (see FIG. 4). The monitoring of the in-game behavior of the players may include identifying and recording respective historical player attributes for respective players of the game, and linking the historical player attributes to respective outcomes of different instances of sponsored content presentation. In one example embodiment, the monitored and recorded behavior may include player click-streams while players are interacting with sponsored content or other game elements. In addition to some of the attributes mentioned above, monitored attributes may include gender, age, device attributes, games played, friends, and so forth. Engagement with and completion of various types of creative content, including sponsored content, may be captured.

The monitoring may be performed on an ongoing basis, and the method 512 may include dynamically updating the historical interaction data, at operation 636. The game system 301 may thus include a feedback loop, so that it is self-learning and dynamically updates the empirical data upon which automated incentive reward variation is based.

A benefit of the above-describe example methods and systems is that user-specific dynamic adjustment of incentive rewards is expected greatly to increase user engagement and completion of sponsored content and associated interactive activities. Conventional reward-based ads are static in nature, with the same reward offered to every user, irrespective of their previous history or engagement. Some prior systems provide for user-specific volume and/or frequency caps, but these do not provide for offering a user-specific modified or adjusted incentive reward.

For example, consider an in-game ad campaign within Zynga's Farmville 2™ game that rewards users for watching video ads. User A, who has seen the video before, may get a different reward for watching the video a second time. User B, who has never seen the video, may get a standard or default reward, and User C, who is collecting farm animals, may get one or more animals as a reward.

The example method makes incentive rewards dynamic per player, using the player's attributes and a prior history (including ad engagement history and gameplay history) to drive custom rewards. The result is to make the incentive rewards more appealing and thus provide for a more engaging ad experience, further resulting in improved conversion and completion rates.

Figure 8:
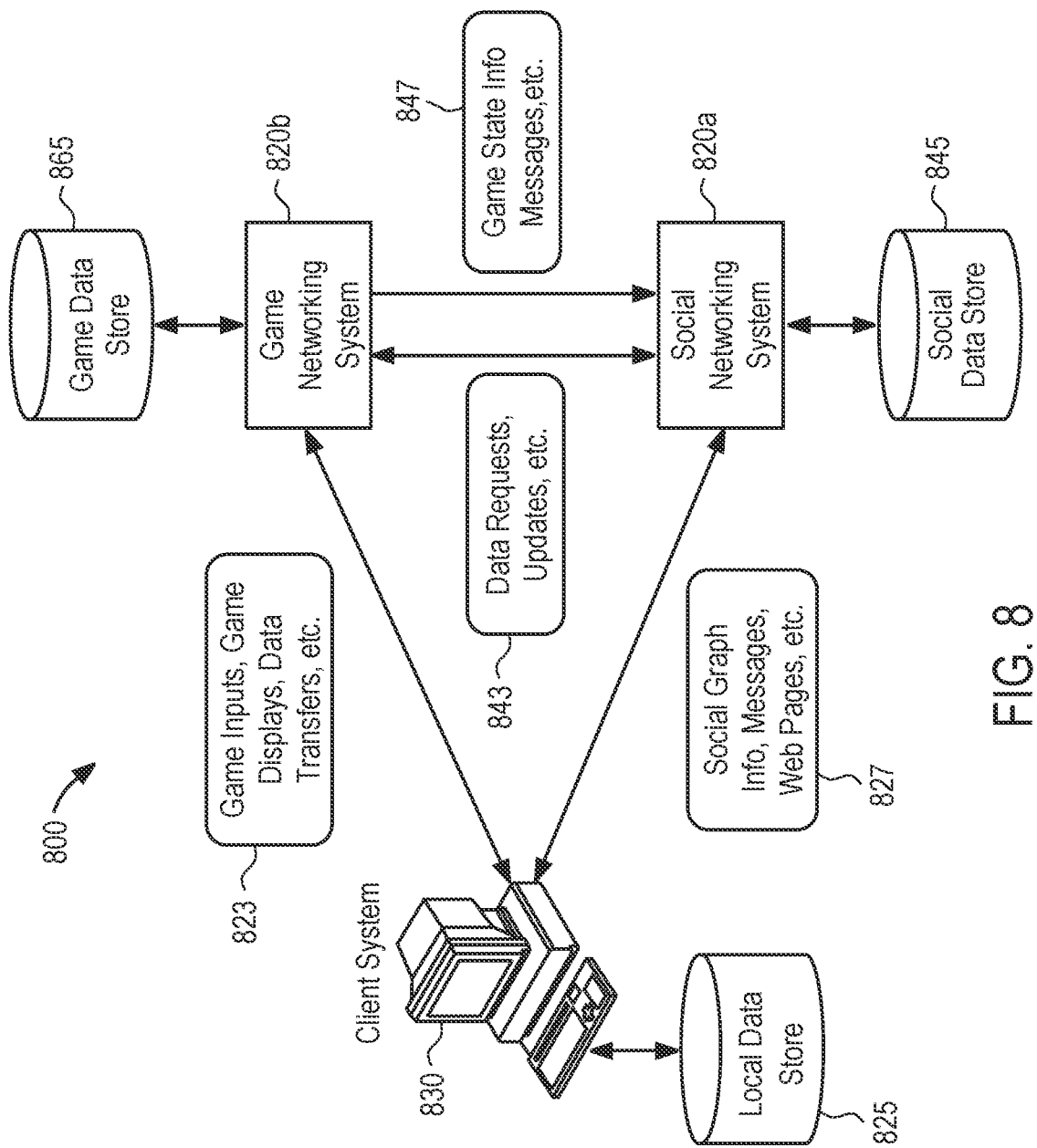
FIG. 8 illustrates data flow between example components of the example system of FIG. 1.

FIG. 8 illustrates an example data flow between the components of system 800. In particular embodiments, system 800 can include client system 830, social networking system 820a, and game networking system 820b. The components of system 800 can be connected to each other in any suitable configuration, using any suitable type of connection. The components may be connected directly or over any suitable network. Client system 830, social networking system 820a, and game networking system 820b can each have one or more corresponding data stores such as local data store 825, social data store 845, and game data store 865, respectively. Social networking system 820a and game networking system 820b can also have one or more servers that can communicate with client system 830 over an appropriate network. Social networking system 820a and game networking system 820b can have, for example, one or more internet servers for communicating with client system 830 via the Internet. Similarly, social networking system 820a and game networking system 820b can have one or more mobile servers for communicating with client system 830 via a mobile network (e.g., GSM, PCS, Wi-Fi, WPAN, and the like). In some embodiments, one server may be able to communicate with client system 830 over both the Internet and a mobile network. In other embodiments, separate servers can be used.

Client system 830 can receive and transmit data 823 to and from game networking system 820b. This data can include, for example, webpages, messages, game inputs, game displays, HTTP packets, data requests, transaction information, updates, and other suitable data. At some other time, or at the same time, game networking system 820b can communicate data 843 and 847 (e.g., game state information, game system account information, page info, messages, data requests, updates, and so forth) with other networking systems, such as social networking system 820a (e.g., Facebook®, Myspace, and the like). Client system 830 can also receive and transmit data 827 to and from social networking system 820a. This data can include, for example, webpages, messages, social graph information, social network displays, HTTP packets, data requests, transaction information, updates, and other suitable data.

Communication between client system 830, social networking system 820a, and game networking system 820b can occur over any appropriate electronic communication medium or network using any suitable communications protocols. For example, client system 830, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as HTTP and other communications protocols, such as HTTP-S, FTP, SNMP, TELNET, and a number of other protocols. In addition, a server in one interaction context may be a client in another interaction context. In particular embodiments, the information transmitted between hosts may be formatted as HTML documents. Other structured document languages or formats can be used, such as XML and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 820b, the BLOB containing the game state for the instance corresponding to the player can be transmitted to client system 830 for use by a client-side executable to process. In particular embodiments, the client-side executable may be a FLASH-based game, which can de-serialize the game state data in the BLOB. As a player plays the game, the game logic implemented at client system 830 maintains and modifies the various game state parameters locally. The client-side game logic may also batch game events, such as mouse clicks, and transmit these events to game networking system 820b. Game networking system 820b may itself operate by retrieving a copy of the BLOB from a database or an intermediate memory cache (memcache) layer. Game networking system 820b can also de-serialize the BLOB to resolve the game state parameters and execute its own game logic based on the events in the batch file of events transmitted by the client to synchronize the game state on the server side. Game networking system 820b may then re-serialize the game state, now modified, into a BLOB and pass this to a memory cache layer for lazy updates to a persistent database.

With a client-server environment in which the online games may run, one server system, such as game networking system 820b, may support multiple client systems 830. At any given time, there may be multiple players at multiple client systems 830, all playing the same online game. In practice, the number of players playing the same game at the same time may be very large. As the game progresses with each player, multiple players may provide different inputs to the online game at their respective client systems 830, and multiple client systems 830 may transmit multiple player inputs and/or game events to game networking system 820b for further processing. In addition, multiple client systems 830 may transmit other types of application data to game networking system 820b.

In particular embodiments, a computer-implemented game may be a text-based or turn-based game implemented as a series of web pages that are generated after a player selects one or more actions to perform. The web pages may be displayed in a browser client executed on client system 830. As an example and not by way of limitation, a client application downloaded to client system 830 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF (Small Web Format) object that is embedded in a web page and executable by a Flash media player plug-in. In particular embodiments, one or more described webpages may be associated with or accessed by social networking system 820a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 830, either caused by an action of a game player or by the game logic itself, client system 830 may need to inform game networking system 820b of the update. For example, if the game is a farming game with a harvest mechanic (such as Zynga® FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 800 is discussed in reference to updating a multi-player online game hosted on a network-addressable system (such as, for example, social networking system 820a or game networking system 820b), where an instance of the online game is executed remotely on a client system 830, which then transmits application event data to the hosting system such that the remote game server synchronizes game state associated with the instance executed by the client system 830.

In particular embodiments, one or more objects of a game may be represented as an Adobe® Flash (or other authoring environment, such as HTML5) object. Flash may manipulate vector and raster graphics, and supports bidirectional streaming of audio and video. "Flash" may mean the authoring environment, the player, or the application files. In particular embodiments, client system 830 may include a Flash client. The Flash client may be configured to receive and run Flash application or game object code from any suitable networking system (such as, for example, social networking system 820a or game networking system 820b). In particular embodiments, the Flash client may be run in a browser client executed on client system 830. A player can interact with Flash objects using client system 830 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 830, the Flash client may send the events that caused the game state changes to the in-game object to game networking system 820b. However, to expedite the processing and hence the speed of the overall gaming experience, the Flash client may collect a batch of some number of events or updates into a batch file. The number of events or updates may be determined by the Flash client dynamically or determined by game networking system 820b based on server loads or other factors. For example, client system 830 may send a batch file to game networking system 820b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 830. In particular embodiments, the batch file may be a text file and the name-value pairs may be in string format.

In particular embodiments, when a player plays an online game on client system 830, game networking system 820b may serialize all the game-related data, including, for example and without limitation, game states, game events, and user inputs, for this particular user and this particular game into a BLOB and store the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 820b may retrieve the corresponding BLOB from the database to determine the most-recent values of the game-related data. In particular embodiments, while a player is playing the online game, game networking system 820b may also load the corresponding BLOB into a memory cache so that the game system may have faster access to the BLOB and the game-related data contained therein.

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 9:
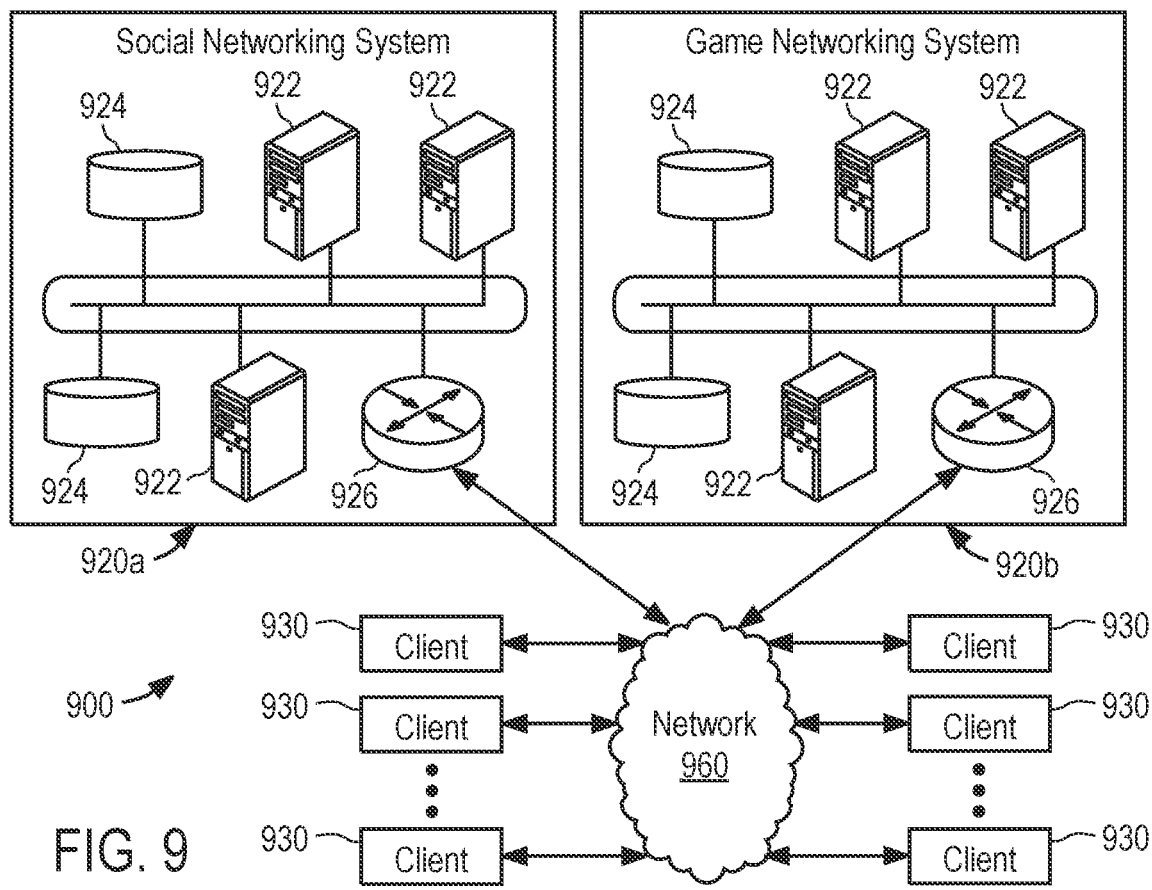
FIG. 9 illustrates an example network environment in which various embodiments may operate.

Particular embodiments may operate in a WAN environment, such as the Internet, including multiple network addressable systems. FIG. 9 illustrates an example network environment 900, in which various example embodiments may operate. Network cloud 960 generally represents one or more interconnected networks, over which the systems and hosts described herein can communicate. Network cloud 960 may include packet-based WANs (such as the Internet), private networks, wireless networks, satellite networks, cellular networks, paging networks, and the like. As FIG. 9 illustrates, particular embodiments may operate in a network environment comprising one or more networking systems, such as social networking system 920a, game networking system 920b, and one or more client systems 930. The components of social networking system 920a and game networking system 920b operate analogously; as such, hereinafter they may be referred to simply at networking system 920. Client systems 930 are operably connected to the network environment via a network service provider, a wireless carrier, or any other suitable means.

Networking system 920 is a network addressable system that, in various example embodiments, comprises one or more physical servers 922 and data stores 924. The one or more physical servers 922 are operably connected to network cloud 960 via, by way of example, a set of routers and/or networking switches 926. In an example embodiment, the functionality hosted by the one or more physical servers 922 may include web or HTTP servers and FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 922 may host functionality directed to the operations of networking system 920. Hereinafter servers 922 may be referred to as server 922, although server 922 may include numerous servers hosting, for example, networking system 920, as well as other content distribution servers, data stores, and databases. Data store 924 may store content and data relating to, and enabling, operation of networking system 920 as digital data objects. A data object, in particular embodiments, is an item of digital information typically stored or embodied in a data file, database, or record. Content objects may take many forms, including text (e.g., ASCII, SGML, HTML), images (e.g., jpeg, tif, and gif), graphics (vector-based or bitmap), audio, video (e.g., mpeg), or other multimedia, and combinations thereof. Content object data may also include executable code objects (e.g., games executable within a browser window or frame), podcasts, and the like. Logically, data store 924 corresponds to one or more of a variety of separate and integrated databases, such as relational databases and object-oriented databases, that maintain information as an integrated collection of logically related records or files stored on one or more physical systems. Structurally, data store 924 may generally include one or more of a large class of data storage and management systems. In particular embodiments, data store 924 may be implemented by any suitable physical system(s) including components such as one or more database servers, mass storage media, media library systems, storage area networks, data storage clouds, and the like. In one example embodiment, data store 924 includes one or more servers, databases (e.g., MySQL), and/or data warehouses. Data store 924 may include data associated with different networking system 920 users and/or client systems 930.

Client system 930 is generally a computer or computing device including functionality for communicating (e.g., remotely) over a computer network. Client system 930 may be a desktop computer, laptop computer, personal digital assistant (PDA), in- or out-of-car navigation system, smart phone or other cellular or mobile phone, or mobile gaming device, among other suitable computing devices. Client system 930 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 930 to enter addresses of specific network resources to be retrieved, such as resources hosted by networking system 920. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web-browser-supported languages and technologies include XML, the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 930 desires to view a particular webpage (hereinafter also referred to as a target structured document) hosted by networking system 920, the user's web browser, or other document rendering engine or suitable client application, formulates and transmits a request to networking system 920. The request generally includes a URL or other document identifier as well as metadata or other information. By way of example, the request may include information identifying the user, such as a user ID, as well as information identifying or characterizing the web browser or operating system running on the user's client system 930. The request may also include location information identifying a geographic location of the user's client system 930 or a logical network location of the user's client system 930. The request may also include a timestamp identifying when the request was transmitted.

Although the example network environment described above and illustrated in FIG. 9 is described with respect to social networking system 920a and game networking system 920b, this disclosure encompasses any suitable network environment using any suitable systems. As an example and not by way of limitation, the network environment may include online media systems, online reviewing systems, online search engines, online advertising systems, or any combination of two or more such systems.

Figure 10:
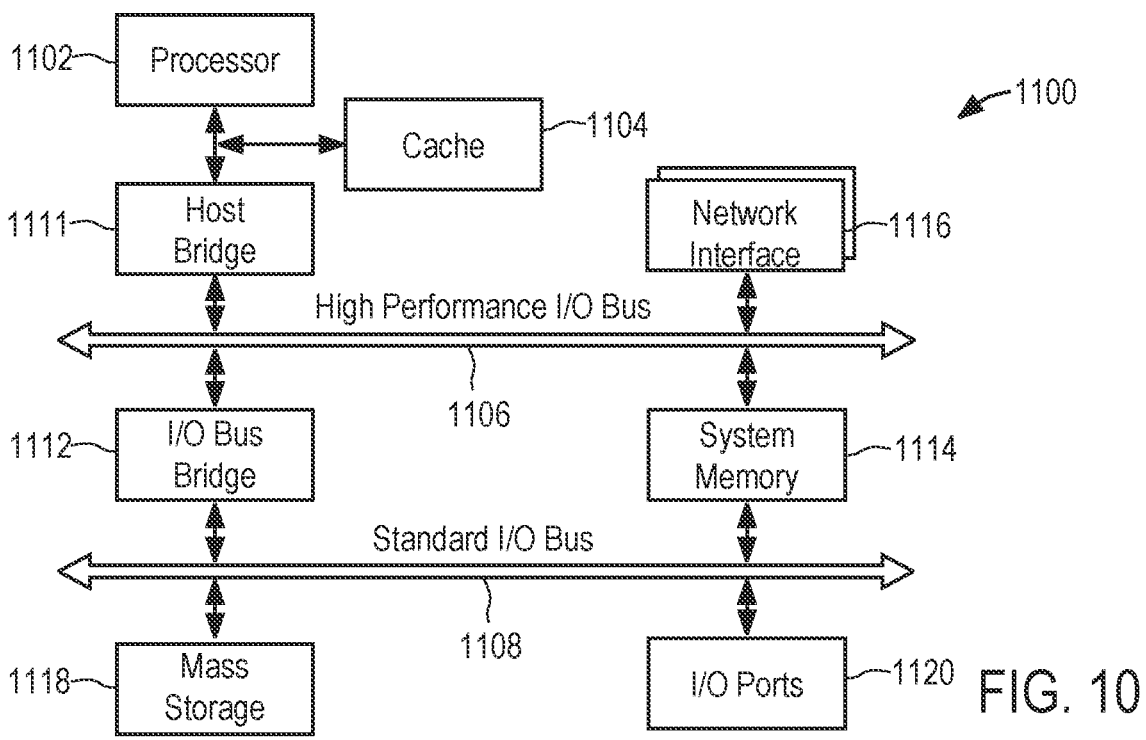
FIG. 10 illustrates an example computing system architecture, which may be used to implement one or more of the methodologies described herein.

FIG. 10 illustrates an example computing system architecture, which may be used to implement a server 922 or a client system 930. In one embodiment, a hardware system 1100 comprises a processor 1102, a cache memory 1104, and one or more executable modules and drivers, stored on a tangible computer readable medium, directed to the functions described herein. Additionally, hardware system 1100 may include a high performance input/output (I/O) bus 1106 and a standard I/O bus 1108. A host bridge 1111 may couple processor 1102 to high performance I/O bus 1106, whereas I/O bus bridge 1112 couples the two buses 1106 and 1108 to each other. A system memory 1114 and one or more network/communication interfaces 1116 may couple to high-performance I/O bus 1106. Hardware system 1100 may further include video memory (not shown) and a display device coupled to the video memory. Mass storage 1118 and I/O ports 1120 may couple to standard I/O bus 1108. Hardware system 1100 may optionally include a keyboard, a pointing device, and a display device (not shown) coupled to standard I/O bus 1108. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1100 are described in greater detail below. In particular, network/communication interface 1116 provides communication between hardware system 1100 and any of a wide range of networks, such as an Ethernet (e.g., IEEE 802.3) network, a backplane, and so forth. Mass storage 1118 provides permanent storage for the data and programming instructions to perform the above-described functions implemented in servers 922, whereas system memory 1114 (e.g., DRAM) provides temporary storage for the data and programming instructions when executed by processor 1102. I/O ports 1120 are one or more serial and/or parallel communication ports that provide communication between additional peripheral devices, which may be coupled to hardware system 1100.

Hardware system 1100 may include a variety of system architectures, and various components of hardware system 1100 may be rearranged. For example, cache memory 1104 may be on-chip with processor 1102. Alternatively, cache memory 1104 and processor 1102 may be packed together as a "processor module," with processor 1102 being referred to as the "processor core." Furthermore, certain embodiments of the present disclosure may not require nor include all of the above components. For example, the peripheral devices shown coupled to standard I/O bus 1108 may couple to high performance I/O bus 1106. In addition, in some embodiments, only a single bus may exist, with the components of hardware system 1100 being coupled to the single bus. Furthermore, hardware system 1100 may include additional components, such as additional processors, storage devices, or memories.

An operating system manages and controls the operation of hardware system 1100, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

One or more features from any embodiment may be combined with one or more features of any other embodiment without departing from the scope of the disclosure.

A recitation of "a," "an," or "the" is intended to mean "one or more" unless specifically indicated to the contrary. In addition, it is to be understood that functional operations, such as "awarding," "locating," "permitting," and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features, and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, and the like), that makes API calls directly to a server. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

We claim:

1. A system comprising:
one or more computer processor devices; and
memory storing instructions that, when executed by the one or more computer processor devices, configure the system to perform operations comprising:
identifying an attribute of a player of a computer-implemented game played by the player via a game interface generated on a client device associated with the player;
in an automated operation, determining a player-specific custom in-game reward for interaction by the player with an advertisement to be generated in the game interface, wherein the determining of the custom in-game reward comprises automatically selecting, based at least in part on the player attribute, a particular one of a predefined plurality of benefit types as custom benefit type available to the player for interaction with the advertisement; and
causing display in the game interface of a player-selectable user interface element that provides to the player an option of interacting with the advertisement to obtain the custom in-game reward.

2. The system of claim 1, wherein the predefined plurality of benefit types includes a resource boost that provides to a game character of the player an increase in the available amount of a particular type of in-game resource.

3. The system of claim 1, wherein the predefined plurality of benefit types includes an in-game object providing associated gameplay functionalities.

4. The system of claim 1, wherein the predefined plurality of benefit types includes a virtual currency bonus.

5. The system of claim 1, wherein the instructions further configure the system to:
based at least in part on the player attribute, determine for the custom in-game reward one or more custom properties additional to the custom benefit type, so that the custom in-game reward has a plurality of custom properties.

6. The system of claim 5, wherein the plurality of custom properties includes a customized quantum of an in-game benefit provided by acquisition of the custom in-game reward.

7. The system of claim 1, wherein the instructions further configure the system such that a procedure for determining the custom in-game reward includes:
calculating an interaction probability for the player based at least in part on the player attribute; and
selecting the custom benefit type based at least in part on the calculated interaction probability for the player.

8. The system of claim 7, wherein the instructions further configure the system such that a procedure for selecting the custom benefit type provides for an inverse relationship between an in-game value of the custom benefit type and the calculated interaction probability.

9. The system of claim 7, wherein the instructions further configure the system such that a procedure for calculating the interaction probability comprises statistical correlation of the player attribute to historical interaction data that indicate historical behavior of multiple players with respect to advertisements.

10. The system of claim 7, wherein the procedure for calculating the interaction probability comprises:

identifying a set of player attributes applicable to the player; and
performing statistical analysis of historical interaction data for multiple players based on the set of player attributes, to estimate a historical rate of interaction with advertisements by players having a respective set of player attributes substantially corresponding to the set of player attributes of the player.

11. The system of claim 10, wherein the set of player attributes comprises historical behavior of the player.

12. The system of claim 11, wherein the historical behavior comprises historical gameplay behavior of the player.

13. The system of claim 1, wherein the interaction with the advertisement comprises watching video content forming part of the advertisement.

14. The system of claim 1, wherein the interaction with the advertisement comprises completing a survey.

15. A method comprising:
identifying an attribute of a player of a computer-implemented game played by the player via a game interface generated on a client device associated with the player;
in an automated operation performed using one or more computer processor devices configured therefor, determining a player-specific custom in-game reward for interaction by the player with an advertisement to be generated in the game interface, wherein the determining of the custom in-game reward comprises automatically selecting, based at least in part on the player attribute, a particular one of a predefined plurality of benefit types as custom benefit type available to the player for interaction with the advertisement; and
causing display in the game interface of a player-selectable user interface element that provides to the player an option of interacting with the advertisement to obtain the custom in-game reward.

16. The method of claim 15, further comprising:
based at least in part on the player attribute, determining for the custom in-game reward a customized quantum of the custom benefit type available to the player for interaction with the advertisement.

17. The method of claim 15, wherein the determining of the custom in-game reward comprises:
calculating an interaction probability for the player based at least in part on the player attribute; and
selecting the custom benefit type based at least in part on the calculated interaction probability for the player.

18. The method of claim 17, wherein the selecting of the custom benefit type is such that there is an inverse relationship between an in-game value of the custom benefit type and the calculated interaction probability.

19. A non-transitory computer-readable storage medium having stored thereon instructions that, when executed by a computer system, cause the computer system to perform operations comprising:
identifying an attribute of a player of a computer-implemented game played by the player via a game interface generated on a client device associated with the player;
in an automated operation, determining a player-specific custom in-game reward for interaction by the player with an advertisement to be generated in the game interface, wherein the determining of the custom in-game reward comprises automatically selecting, based at least in part on the player attribute, a particular one of a predefined plurality of benefit types as custom benefit type available to the player for interaction with the advertisement; and causing display in the game interface of a player-selectable user interface element that provides to the player an option of interacting with the advertisement to obtain the custom in-game reward.

\* \* \* \* \*